(12) United States Patent
Muggleton (10) Patent No.: US 12,246,295 B2
(45) Date of Patent: *Mar. 11, 2025

(54) SYSTEM FOR INTRODUCING GAS INTO A GAS GRID PIPELINE

(71) Applicant: Kevin James Muggleton, Hinckley (GB)

(72) Inventor: Kevin James Muggleton, Hinckley (GB)

(73) Assignee: GREENER BLUE LIMITED, Leicestershire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,517

(22) Filed: Jul. 26, 2022

(65) Prior Publication Data

US 2022/0355259 A1 Nov. 10, 2022

Related U.S. Application Data

(63) Continuation of application No. 16/300,088, filed as application No. PCT/GB2017/051280 on May 9, 2017, now Pat. No. 11,406,953.

(30) Foreign Application Priority Data

May 9, 2016 (GB) ...................... 1608045

(51) Int. Cl.
*B01F 35/22* (2022.01)
*B01F 23/10* (2022.01)
(Continued)

(52) U.S. Cl.
CPC .......... *B01F 35/2202* (2022.01); *B01F 23/19* (2022.01); *B01F 25/31241* (2022.01);
(Continued)

(58) Field of Classification Search
CPC ........................ B01F 15/00285; B01F 5/0426; B01F 5/0428; B01F 5/043; B01F 5/0498;
(Continued)

(56) References Cited

U.S. PATENT DOCUMENTS 2,424,654 A 7/1947 Gamble
3,689,237 A * 9/1972 Stark et al. ....... B01F 25/43211
261/78.2
(Continued)

FOREIGN PATENT DOCUMENTS

DE 19907362 A1 8/2000
GB 2550130 A * 11/2017
(Continued)

OTHER PUBLICATIONS

GB1608045.9 Search Report dated Oct. 28, 2016.
PCT/GB2017/051280 International Search Report dated Sep. 22, 2017.

*Primary Examiner* — Charles Cooley
(74) *Attorney, Agent, or Firm* — Daniel J. Chalker; Edwin S. Flores; Chalker Flores, LLP (57) ABSTRACT

A system for introducing gas from an unconventional source into a gas grid pipeline includes a passive blender (10) that introduces gas from an unconventional source (1) into a gas grid (2), the passive blender (10) having gas inputs (3, 11) from the unconventional source (1) and the gas grid (2) and a blended gas output (12), and wherein an internal flow path within the passive blender (10) is shaped and sized to provide entraining and mixing of the gases. The passive blender (10) acts to entrain gas from a gas grid (2) through input (11) by utilising the flow of gas from an unconventional source (1) through input 3, proportionally blending inputs 3 and 11 before outputting the blended gas back to the main gas grid (2). The system comprises the passive blender (10) of the present invention, a first gas input pipe (11) from (Continued)

a grid gas pipeline (2) into the passive blender (10) a second gas input pipe (3) from the unconventional source (1) into the passive blender (1), and an output pipe (12) from the passive blender (10) into the grid gas pipeline (2). The blender (10) and system are advantageous in that they can greatly reduce the necessary conditioning of unconventional gas before it is introduced into a gas grid supply (2) without additional flow motivation or controls.

19 Claims, 3 Drawing Sheets

(51) Int. Cl.
*B01F 25/312* (2022.01)
*B01F 25/32* (2022.01)

(52) U.S. Cl.
CPC .. *B01F 25/31242* (2022.01); *B01F 25/31243* (2022.01); *B01F 25/32* (2022.01)

(58) Field of Classification Search
CPC .... B01F 3/026; B01F 5/0413; B01F 35/2202; B01F 23/19; B01F 25/31241; B01F 25/31242; B01F 25/31243; B01F 25/32; B01F 25/312; C10L 3/00; C10L 3/06; C10L 3/10; Y02E 50/30
See application file for complete search history.

(56) References Cited

U.S. PATENT DOCUMENTS

| | | | |
|---|---|---|---|
| 5,163,830 A | 11/1992 | Pfefferkorn | |
| 6,749,330 B2 * | 6/2004 | Allen | B01F 25/3132 366/178.2 |
| 7,448,794 B2 * | 11/2008 | Hansen | B01F 25/3132 366/337 |
| 8,317,309 B2 | 11/2012 | Albrecht | |
| 8,317,390 B2 * | 11/2012 | Albrecht | B01F 23/10 366/337 |
| 8,529,117 B2 * | 9/2013 | Hesketh | B01F 23/10 239/424 |
| 9,222,048 B1 | 12/2015 | Foody | |
| 11,406,953 B2 * | 8/2022 | Muggleton | B01F 35/2202 |
| 2002/0017731 A1 * | 2/2002 | Ruscheweyh | B01F 25/4311 261/79.2 |
| 2002/0020076 A1 * | 2/2002 | Ruscheweyh | B01F 25/43161 34/61 |
| 2004/0141410 A1 | 7/2004 | Fenton et al. | |
| 2005/0190643 A1 * | 9/2005 | Hansen | B01F 25/3131 366/337 |
| 2018/0147529 A1 * | 5/2018 | Yano | F23J 15/006 |
| 2019/0176115 A1 * | 6/2019 | Muggleton | B01F 25/31243 |
| 2022/0355259 A1 * | 11/2022 | Muggleton | B01F 25/31241 |

FOREIGN PATENT DOCUMENTS

| | | | |
|---|---|---|---|
| JP | 10-237472 A | | 9/1998 |
| JP | 2010-059416 A | * | 3/2010 |
| JP | 2010-095639 A | | 4/2010 |
| JP | 2012-021246 A | | 2/2012 |
| KR | 1020150022174 | | 8/2016 |
| WO | 2012148441 A1 | | 11/2012 |

* cited by examiner

SYSTEM FOR INTRODUCING GAS INTO A GAS GRID PIPELINE

CROSS-REFERENCE TO RELATED APPLICATIONS

This application is a continuation of U.S. patent application Ser. No. 16/300,088, filed on Nov. 9, 2018, now U.S. Pat. No. 11,406,953, which is the National Stage of International Application No. PCT/GB2017/051280, filed on May 9, 2017, which claims priority to Great Britain Patent Application No. 1608045.9, filed on May 9, 2016. The contents of foregoing applications are hereby incorporated by reference in their entirety.

TECHNICAL FIELD OF THE INVENTION

The present invention relates to the introduction of gases from unconventional gas sources, such as biomethane, into the gas grid. An unconventional gas source is considered to be any source of gas wherein the gas has a lower calorific value than the gas in the grid to which it is being introduced. In particular, the present invention provides a system and method for introducing gas from an unconventional source into the gas grid using a passive inspirator to produce a blended gas output suitable for direct reintroduction to the gas grid. The system of the present invention may be entirely passive or may further comprise means for modifying the calorific value of the blended gas output, for example by the injection of liquid petroleum gas or propane.

BACKGROUND OF THE INVENTION

In order to reduce the reliance on diminishing natural gas resources there is an increasing drive to utilise gas produced from unconventional sources, such as biogas produced by decomposition under anaerobic conditions. Biogas is produced from various sources, including landfills, sewage treatment plants and anaerobic digesters that treat agricultural products. Unconventional gases generally have a lower calorific value (CV) than natural gas that is transported in the main gas grid.

Generally unconventional gas, including but not limited to biogas, has a significantly different composition from natural gas that is transported in the main gas grid. The composition and properties of gas within the main gas grid is carefully controlled to ensure it is of sufficient quality and to ensure a safe and consistent supply. As a result of this unconventional gas with a lower CV cannot be directly introduced into the main gas grid without first being conditioned. In order to avoid these technically difficult conditioning requirements most current uses of unconventional gas involve utilising the gas directly, rather than conditioning the gas and introducing it into the main gas grid.

There are some small-scale operations where unconventional gas is introduced into the gas grid. In these operations the unconventional gas is conditioned to make it suitable for introduction. This has been achieved in various different ways. Where the unconventional gas is biogas, generally it is first conditioned to transform it into biomethane, which is a more usable form of biogas. The biomethane is then further conditioned by mixing with a separate gas source, such as liquid petroleum gas (LPG) or propane, to ensure it meets the composition and property requirements for the gas grid. Odorant and/or other additives may also be introduced as part of the conditioning process. After this conditioning has taken place the resulting conditioned gas is introduced into the gas grid.

The introduction of unconventional gas into the gas grid is an active area of research. Current apparatus used for conditioning unconventional gas, such as biogas and/or biomethane, are complex involving several complex parts including constantly controlled valves, membrane filters and water washes. They generally also require extra gas sources in addition to the unconventional gas source.

Figure 1:
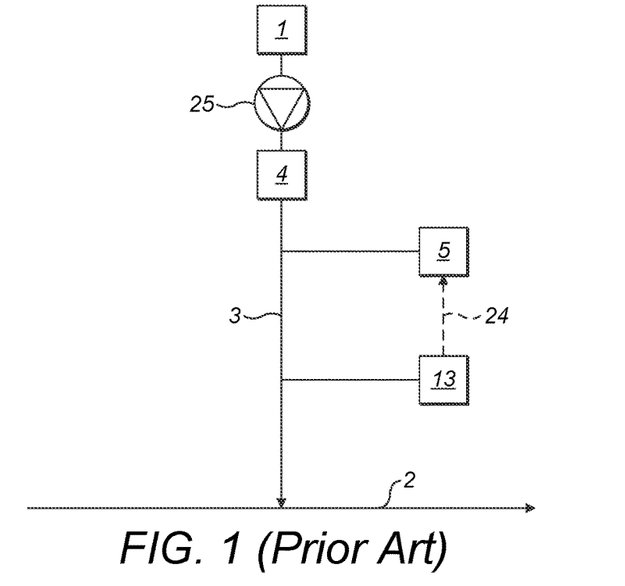
FIG. 1 is a schematic diagram of a system for introducing gas from an unconventional source into a grid gas pipeline according to the prior art.

A system for introducing unconventional gas into a gas grid according to the state of the art is shown in FIG. 1. The system provides gas from an unconventional gas source 1 into a grid gas pipeline 2. Flow from the unconventional source to the gas grid is controlled by adjusting the pressure of the gas leaving the unconventional source using a compressor or regulator to ensure the pressure is sufficiently above the gas grid pressure to achieve the required flow in pipe 3. The system comprises a pipe 3, a compressor or regulator 25, a liquid petroleum gas (LPG) injection apparatus 5, cleaner 4, and an analyser 13. The pipe 3 transports gas from the unconventional source 1 into the grid gas pipeline 2. As the gas is transported from the unconventional source 1 LPG is injected into the gas by means of controlled LPG injection apparatus 5, this is done in order to condition the gas to make it suitable for introduction into the grid gas pipeline 2. The gas is also cleaned by the cleaner 4. Most unconventional gas sources have a higher methane content than grid gas and introducing LPG produces a gas with a profile that more closely matches the profile of the grid gas.

After LPG has been introduced into the pipe 3, gas is sampled from the pipe and supplied to an analyser 13. The analyser 13 is used to evaluate the physical components and characteristics of the gas to ensure it meets the requirements for entering the grid gas pipeline 2. The physical characteristics measured and/or calculated by the analyser 13 may include calorific value, and specific gravity. This may be used to calculate a Wobbe number for the gas. A Wobbe number generally defines how well a gas will burn and is calculated as a factored ratio of calorific value and specific gravity.

A feedback signal 24 is sent from analyser 13 to the LPG injector 5 to optimise the injection rate and ensure the gas to grid is compliant with the requirements of gas entering the gas grid.

The purpose of a Biogas site is to reduce the use of fossil based fuels. The requirement for large-scale propane injection, the production of the propane and transporting the propane to the Biogas site is costly, environmentally damaging and opposes the primary function of the Biogas site. For these reasons there is a need for an improved system that reduces or entirely eliminates the need for propane to be injected at unconventional gas to grid connections.

JP2010059416 discloses an alternative system for offline blending wherein a portion of the gas-flow through a grid gas pipeline is routed out of the grid gas pipeline, mixed with gas from a separate source, and then the resulting mixed gas is reintroduced into the grid gas pipeline. The system of JP2010059416 utilises either a pump/compressor to increase the pressure of the gas input from the grid gas pipeline or requires a secondary higher pressure grid input gas in order to motivate the mixing flow. The use of such pumped/compressed inputs to motivate mixing is undesirable as it adds complexity to the system and requires maintenance, power, and control. The availability of such a secondary higher pressure grid input gas for use as an input to motivate mixing is unlikely to be present at the location where unconventional gas is produced. In light of the above, there is a need for an improved system and method for offline blending that does not require a high pressure input from the main gas grid and that minimises the number of mechanical components.

SUMMARY OF THE INVENTION

The present invention provides a system for introducing gas from an unconventional source into a gas grid pipeline comprising:
- an inspirating passive blender having a grid gas input, an unconventional source input, and a blended gas output, wherein an internal flow path within the passive blender is shaped and sized to provide entraining using an inspiration effect
- a first gas input pipe from a grid gas pipeline into the passive blender;
- a second gas input pipe from the unconventional source into the passive blender; and
- an output pipe from the passive blender into the grid gas pipeline.

According to the meaning of the present invention, an unconventional gas source is any source of gas, other than from the gas grid, which has a calorific value (CV) lower than that of the gas within the gas grid.

A component of the system of the present invention is the inspirating passive blender. This is the component that effects mixing of a grid gas input and the unconventional source input. The inspirating passive blender has gas inputs from the unconventional source and the gas grid and a blended gas output, and an internal flow path within the passive blender that is shaped and sized to provide entraining and mixing of the gases using an inspiration effect. This mixing is achieved passively, without the need for mechanical component and/or external control. Importantly, there is no need for a system of the present invention to require the input from the grid gas pipeline to include a pump or compressor or for the pressure of the gas from the grid gas pipeline to be raised in any other manner.

The system of the present invention is particularly advantageous in that gas from an unconventional source is blended with gas from a grid gas pipeline in a passive blender before it is reintroduced into the grid gas pipeline. This can allow the amount of additional additives, such as propane, that are required to be introduced into the gas from the unconventional source to be significantly reduced or eliminated. Further, this also ensures that gas from the unconventional source that is entering the grid gas pipeline is well mixed with grid gas before it does so, thereby maintaining the quality of gas within the grid gas pipeline.

The passive blender of the system of the present invention is advantageous in that it can be very simple, having no moving parts, and allows a blended gas output of improved suitable physical characteristics to be produced from an unconventional gas input with reduced or completely negated need for additional supplies of alternative gases. In particular the only inputs that are required are an input of unconventional gas and an input of gas from the gas grid. As the passive blender has an input from the gas grid it facilitates gas from an unconventional source to be mixed with grid gas before it enters a grid gas pipeline. This can reduce or negate the need for propane or liquid petroleum gas (LPG) injection without compromising the characteristic requirements of gas entering the gas grid. Even if a propane or LPG injection is required, the amount of propane or LPG that is required to be injected can be much less than in systems according to the prior art.

The gas inputs of the passive blender will be sized and shaped such that the flow rate of the gas from the gas grid input and the unconventional gas input provide an output flow ratio mixture that contains proportions of unconventional gas and gas from the gas grid. In this manner, the passive blender can help ensure that the gas entering the gas grid from the output has acceptable physical characteristics. Maximising the proportion of grid gas in this blend will be advantageous to the reduction of propane or LPG injection. It is not possible to have too much grid gas in a blended gas that is reintroduced into a grid gas pipeline. The passive blender will inherently maintain a proportional blend, the higher the flow of unconventional gas will entrain a proportionally higher flow of grid gas.

As the passive blender is a passive device it does not comprise any moving parts. In particular, the passive blender itself does not comprise any means for varying the flow rate of gas input into it, whether from the unconventional gas source or from the gas grid. As discussed below, in embodiments of the system of the present invention it may be possible to vary the input from the unconventional gas source and/or from the gas grid. The passive blender induces a blending gas flow proportional to the unconventional gas input. The passive blender does not comprise any moving and/or controllable parts. This is preferable as it greatly reduces the burden for gas transporting companies (GT's) to control, maintain and repair the passive blender.

The internal flow path of the passive blender is formed to provide blending of the gas inputs using an inspiration effect. To provide further mixing and entraining. The flow path may be provided with one or more constricting portions and/or one or more expanding portions. The passive blender may be formed such that the gas inputs are restricted and directed into the flow path of the passive blender so as to promote entraining and blending, for example the gas inputs may restrict and direct gas into the flow path at differing directions and/or at angles to the direction of flow through the passive blender.

The inputs of the passive blender may be formed such that the pressure of the gas input from the unconventional source is higher than the pressure of the gas input from the gas grid. This can help promote entrainment and blending of the gases. This can be achieved by compressing or regulating the gas from the unconventional source, for example using a compressor or gas regulator.

A passive blender is formed such that the internal flow path within the blender is formed to blend the gases therein using an inspiration effect. This may be achieved by forming the blender such that it comprises an input section in which a cross-section of the passive blender perpendicular to a direction of flow of gas through the passive blender decreases in the direction of flow; and an output section in which a cross-section of the passive blender perpendicular to the direction of flow increases in the direction of flow. A start of the output section may be directly attached to an end of the input section or there may be an intermediate section formed between an end of the input section and a start of the output section.

If the passive blender is formed in this manner the input from the gas grid will generally be at a start of the input section in the direction of flow of gas through the passive blender. The input from the unconventional source will generally be positioned at the input section before the output section. The input from the unconventional source may be positioned at the end of the input section in the direction of flow, partway along the input section, or at the start of the input section.

If the passive blender comprises an input section and an output section in the manner set out above it may be formed such that the input from the unconventional source is substantially central within the input section and is surrounded within the input section by gas from the gas grid. A passive blender formed in this manner will essentially 'inject' gas from the unconventional source centrally within the passive blender. The injection from the unconventional source will be substantially central within a flow of gas from the gas grid when the passive blender is in use and will be positioned within the input section after the input from the gas grid.

Alternatively, if the passive blender comprises an input section and an output section in the manner set out above it may be formed such that the gas input from the gas grid is positioned at a start of the input section in the direction of flow and the gas input from the unconventional source is positioned at an end of the input section in the direction of flow. In such embodiments the input from the unconventional source may be substantially annular and surround the end of the input section.

The passive blender of a system according to the present invention requires no outside control and would require little maintenance as it has no moving or controllable parts. In most cases, the passive blender and the gas entering the grid gas pipeline therefrom will be the responsibility of the gas transporting company (GT), rather than the producer of the unconventional gas that is fed into the passive blender. The passive blender of a system according to the present invention is likely to be located on the gas grid at a location remote from the gas transporters operators. As a result, it is generally preferable that the system of the present invention has no power supplies or controllable and maintainable parts.

An acceptable range for any specific physical characteristic of gas entering a main gas grid pipeline will be determined by requirements of the GT and by the construction of the passive blender e.g. the required relative flow rates of grid gas and gas from the unconventional source through the passive blender.

The system of the present invention may comprise sampling means provided at a sample point to measure one or more physical characteristics of gas passing through the sample point. A sampling means of a system according to the present invention can be the same as that used by the prior art and may be any suitable sampling means apparent to the person skilled in the art and that can be used for determining one or more components and physical characteristics of gas.

The system of the present invention may further comprise gas conditioning means. As with systems according to the prior art, the gas conditioning may comprise means for injecting propane or LPG into unconventional gas before it enters the system. Suitable injection means will be apparent to the person skilled in the art. Propane or LPG may be injected into the system to raise the calorific value (CV) of the blended gas output from the system to ensure it is suitable for introduction into a grid gas pipeline. This can be necessary if the CV of the gas in the output pipe is below acceptable limits for introduction into a grid gas pipeline.

In order to allow any injection of propane or LPG into the output pipe to be properly controlled the system may comprise a sample point that analyses the calorific value of gas in or from the output pipe. That is, the system may comprise a sample point either located in the output pipe or located away from the output pipe but through which gas from the output pipe is directed. The analysed calorific value of the gas in or from the output pipe can then be used to control the injection of the propane or LPG into the system.

The system of the present invention, as with the prior art, may further comprise a compressor or regulator located in the second gas input pipe to increase or decrease the pressure of the gas from the unconventional source. It is generally preferable that the pressure of the gas from the unconventional source that enters the passive blender is at a higher pressure than the pressure of the main grid gas pipeline, thus it may be necessary to increase the pressure of gas from the unconventional source. The compressor or regulator may be located at any suitable point in the system before the passive blender and may be in the ownership and control of the unconventional gas producer.

The present invention provides a method of conditioning gas from an unconventional source to allow the gas to be entered into a main grid gas pipeline, the method comprising:
  providing a gas input from the grid gas pipeline into a first gas input of an inspirating passive blender;
  providing a gas input from the unconventional source into a second gas input of the passive blender;
  directing an output from the passive blender back into the main grid gas pipeline; wherein
  an internal flow path within the passive blender is shaped and sized to provide entraining using an inspiration effect The method will be carried out such that the output from the passive blender is suitable for being input back into the main grid gas pipeline. This can be achieved by forming the passive blender appropriately, as discussed above, and possibly, in addition, controlling the pressure of the gas from the unconventional source and/or injecting propane or LPG into gas before it directed into the main grid gas pipeline. Generally, the pressure of the input from the grid gas pipeline will be substantially the same as the pressure of the main grid gas pipeline. The pressure of the gas from the unconventional source may be controlled using a compressor, regulator or other appropriate pressure control means.

The method of the present invention may be such that the output from the passive blender passes a sample point and one or more physical components and characteristics of gas passing the sample point is measured; and when the one or more of the measure physical components or characteristics is measured to be outside of an acceptable range for entering the main grid gas pipeline the gas input from the unconventional source is injected with a controlled amount of Propane or LPG. In this manner the method of the present invention, as with the prior art, may prevent gas that is not of suitable characteristics from entering the main grid gas pipeline. The gas input from the unconventional source may be conditioned by injecting a controlled amount of Propane or LPG using a feedback signal from analysis of the blended output gas.

The method of the invention may comprise injecting LPG or propane into either an input of the passive blender or the output of the passive blender before the output gas is analysed and enters the main grid gas pipeline. That is, LPG or propane may be injected into the gas input from the unconventional source, the gas input from the main grid gas pipeline, or the output to the main grid gas pipeline. This may be done to ensure that the calorific value (CV) of the gas entering the grid gas pipeline from the passive blender is within an acceptable range. LPG or propane can be injected in any manner apparent to the person skilled in the art.

In order to ensure that an appropriate amount of LPG or propane is injected it may be preferable that the CV of gas output from the passive blender is analysed before it enters the main grid gas pipeline. The analysed CV of the gas output can then be used as a feedback control to control the amount of LPG or propane injected into the gas. The analysis can be carried out in any appropriate manner.

Further features and advantages of the present invention will be apparent from the embodiments that are shown in the Figures and that are described below.

DETAILED DESCRIPTION OF THE INVENTION

Figure 2:
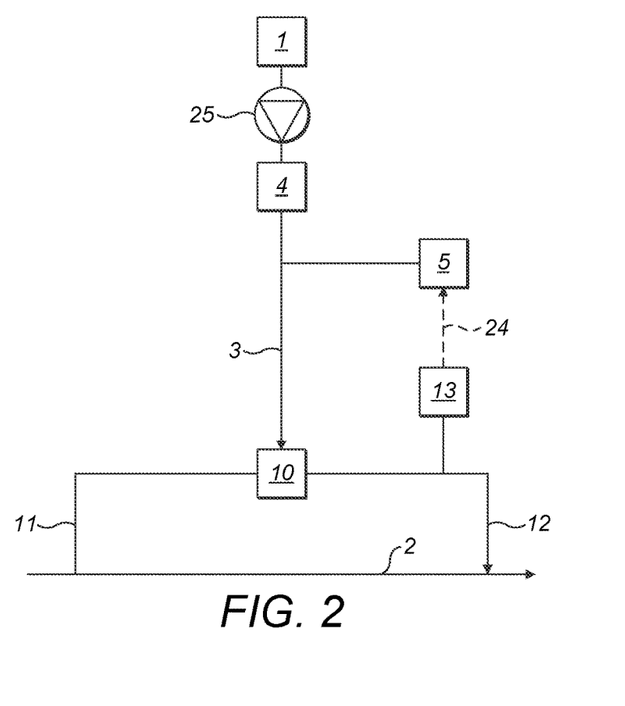
FIG. 2 is a schematic diagram of a system for introducing gas from an unconventional source into a grid gas pipeline according to an embodiment of the present invention.

Part of a system for introducing gas from an unconventional source into a grid gas pipeline according to the present invention is shown in FIG. 2. The system comprises a passive blender 10, a first gas input pipe 11 from a grid gas pipeline 2 into the passive blender 10, a second gas input pipe 3 from an unconventional source 1 into the passive blender 10, and an output pipe 12 from the passive blender 10 to the grid gas pipeline 2. The system further comprises a compressor or regulator 25, a liquid petroleum gas (LPG) injection apparatus 5, a gas cleaner 4, and an analyser 13. The pipe 3 transports gas from the unconventional source 1 into the grid gas pipeline 2. The analyser 13 communicates with the injection apparatus by means of a feedback signal 24. The system of FIG. 2 operates in the following manner.

Gas from the grid gas pipeline 2 is fed into the passive blender 10 via the first gas input pipe 11. This input is at the pressure 'p' of the grid gas pipeline 2. Gas from the unconventional source 1 is fed into the passive blender 10 via the second gas input pipe 3. This input is at a pressure 'P'. Pressure 'P is greater than pressure 'p'. The precise composition of the gas output with regards to proportion of gas from the grid gas pipeline and gas from the unconventional source can be controlled by design of the passive blender 10 and/or the size of the first and second gas input pipes 11, 3 and/or controlling the flow of the gas in the second gas input pipe 3.

Gas from the unconventional source 1 is conditioned and compressed and/or regulated in the manner according to the prior art. This may include using LPG from the LPG injection apparatus 5. The gas is then fed into the passive blender 10 and mixed with gas from the grid gas pipeline 2. The gas then outputs the passive blender 10 through the output pipe 12, passes through a sample point connected to the analyser 13, and is passed into the grid gas pipeline 2 downstream of where the first input pipe 11 takes gas from the grid gas pipeline 2. Should the grid pipeline gas reverse direction of flow, the passive blender system continues to operate safely but less efficiently. The analyser 13 analyses gas passing through the output pipe 12 and when it is determined that the gas in the output pipe 12 is not suitable for entry into the grid gas pipeline 2 this is communicated to the injection apparatus 5 and LPG injection will begin or be increased to until the gas in the output pipe 12 is of an acceptable quality for injection into the grid gas pipeline 2.

As the gas from the unconventional source 1 is mixed with gas from the grid gas pipeline 2 in the passive blender 10 before being introduced into the grid gas pipeline the gas can require less conditioning. In particular, the amount of LPG that is required to be mixed with the gas may be reduced or eliminated. This is because previously it was necessary for the conditioned gas from the unconventional source 1 to be suitable for entering the grid gas pipeline 2, whereas in the system of the present invention all that is required is that conditioned gas from the unconventional source 1 is suitable for entering the grid gas pipeline 2 after it has been mixed with a significant proportion of gas from the grid gas pipeline.

The analyser 13 is provided after the passive blender 10. This provides control of the LPG injection, by means of a signal (24), based on characteristics and properties measured and/or calculated from samples of the blended gas analysed in the analyser 13.

Figure 3:
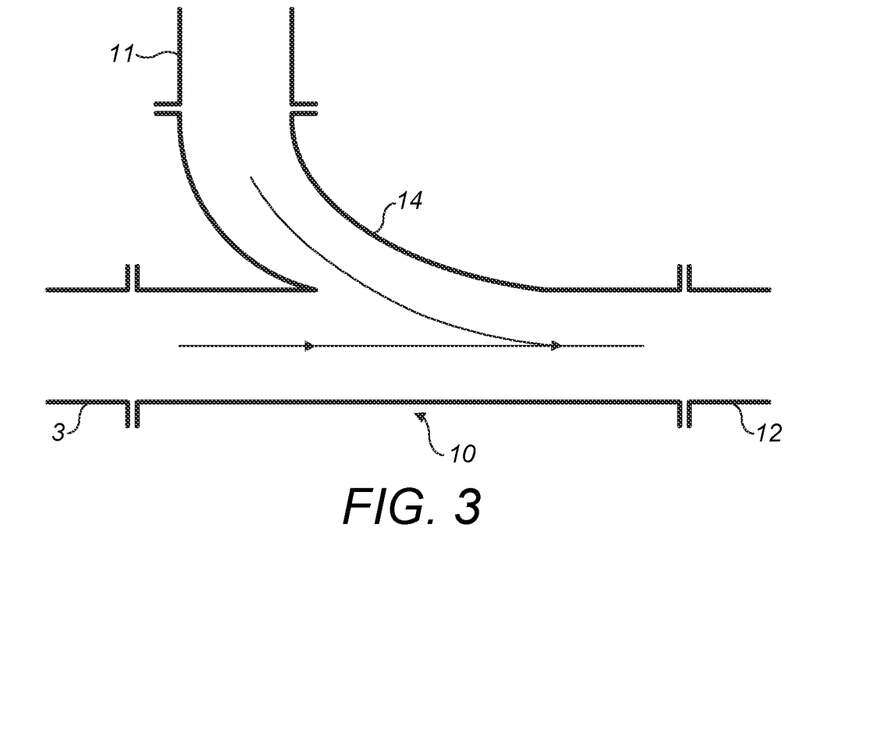
FIG. 3 is a cross-section and schematic of a first embodiment of a passive blender that may form part of a system according to the present invention.

A cross-section of a first embodiment of a passive blender 10 forming part of a system according to the present invention is shown in FIG. 3. The passive blender 10 substantially comprises a swept tee joint 14 formed of a suitable material. The first input pipe 11 from the grid gas pipeline 2 is attached to a side of the passive blender 10. The second input pipe 3 from the unconventional source is attached to a first end of the passive blender 10. The output pipe 12 from the passive blender is attached to a second end of the passive blender 10. The gas from the unconventional source 1 is at pressure 'P'. The gas from the grid gas pipeline 2 is at the same pressure 'p' as the gas in the grid gas pipeline, p being lower than P. Although not accurately depicted in the Figure, where they enter the passive blender the second input pipe 3 is smaller in diameter than the first input pipe 10 and the output pipe 12. In this manner the gas from the unconventional source 1, 3 entrains gas from the grid gas pipeline 2, 11 into its flow and the two are blended together for output through the output pipe 12.

Figure 4:
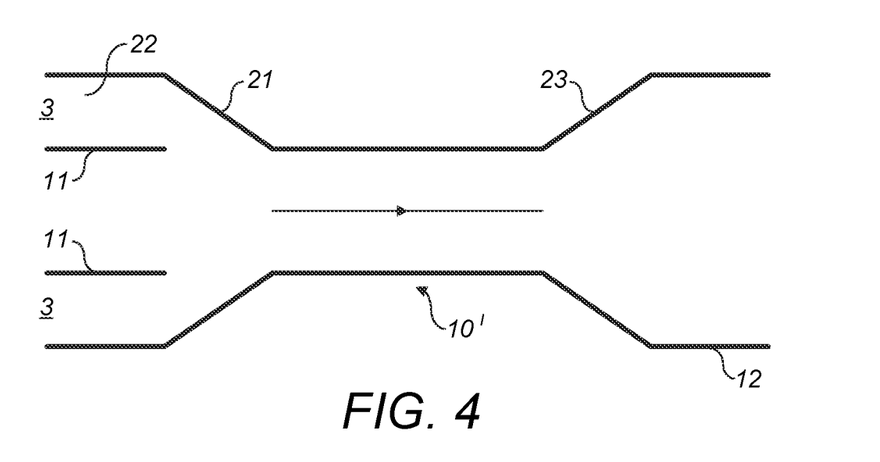
FIG. 4 is a cross-section and schematic of an alternative passive blender that may form part of a system according to the present invention.

A cross-section of a second embodiment of a passive blender 10' that may comprise part of a system according present invention is shown in FIG. 4. This passive blender 10' is cylindrically symmetrical and comprises an input section 21 wherein gas from the grid gas pipeline 2 enters the passive blender, this section narrows in diameter along a direction in which the gas flows. Gas from the unconventional source 1 is input into the passive blender 10' at the end of the input section 21. The input 22 from the unconventional source 1 is substantially annular at input pipe 3 and surrounds the end part of the input section such that the gas from the unconventional source 1 is introduced around the gas from the grid gas pipeline 11 at the narrowest point of the passive blender 10'. After the end of the input section 21 is an output section 23 in which the diameter of the passive blender 10' gradually increases in diameter. The gas from the unconventional source 1 is at pressure 'P'. The gas from the grid gas pipeline 2 enters the passive blender 10' from input pipe 11 at the same pressure 'p' as the gas in the grid gas pipeline, p being lower than P.

The decrease in diameter of the passive blender 10' in the input section 21 followed by the increase in diameter of the passive blender in the output section 23 result in the passive blender 10' and the increased velocity and direction of the gas from input 3 using an inspiration effect to entrain and mix the gas from the grid gas pipeline 2 with the gas from the unconventional source 1.

Figure 5:
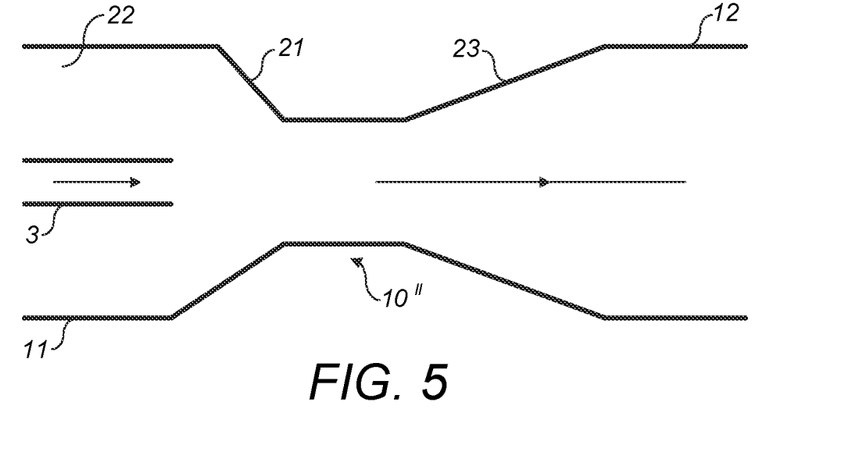
FIG. 5 is a cross-section and schematic of a further alternative passive blender that may form part of a system according to the present invention.

A third embodiment of a passive blender 10" that may form part of a system according to the present invention is shown in FIG. 5. The third embodiment 10" is similar to the second embodiment in that it comprises an input section 21 in which the diameter of the passive blender 10" reduces and an output section 23 in which the diameter of the passive blender 10" increases. However, the gas from the unconventional source 1 is injected substantially centrally into the flow of gas from the grid gas pipeline 2 by means of a substantially central injector pipe 3 that has an outer end positioned within the input section 21 of the passive blender 10". The gas from the unconventional source 1 is at pressure 'P'. The gas from the grid gas pipeline 2 enters the passive blender 10" from input 22 and at the same pressure 'p' as the gas in the grid gas pipeline, p being lower than P.

In the same manner as the second embodiment of the passive blender 10' the decrease in diameter of the passive blender 10' in the input section 21 followed by the increase in diameter of the passive blender in the output section 23 result in the passive blender 10' and the increased velocity and direction of the gas from input 3 using the inspiration effect to entrain and mix the gas from the grid gas pipeline 2 with the gas from the unconventional source 1.

Figure 6:
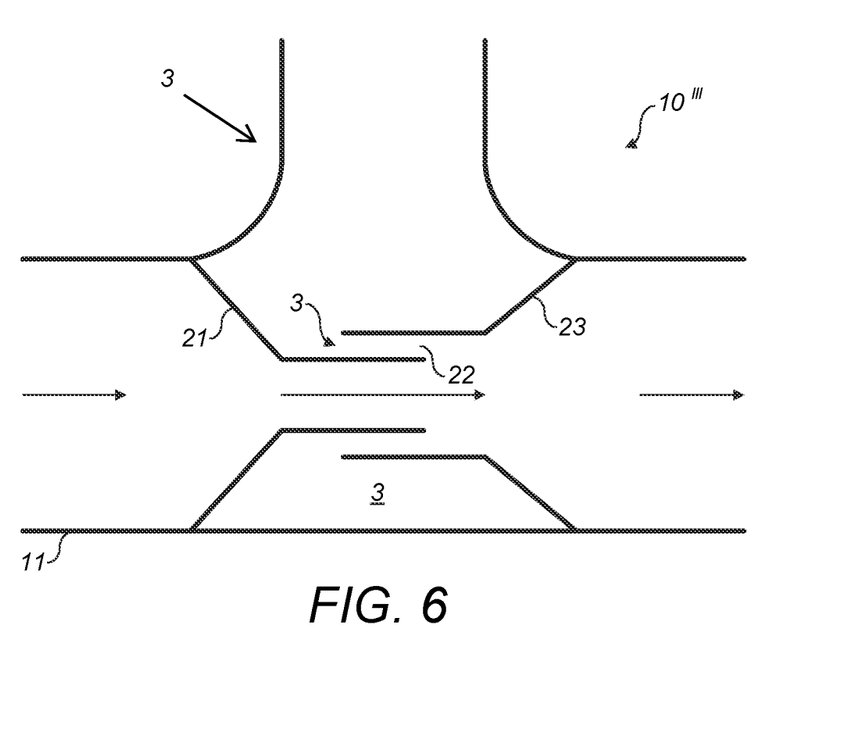
FIG. 6 is a cross-section and schematic of another alternative passive blender that may form part of a system according to the present invention.

A fourth embodiment of a passive blender that may form part of a system according to the present invention is shown in FIG. 6. This passive blender 10''' comprises an input section 21 wherein gas from the grid gas pipeline 2 enters the passive blender, this section narrows in diameter along a direction in which the gas flows. The passive blender 10''' has a central section of relatively small diameter between an end of the input section 21 and a start of an output section 23. In the output section 23 the diameter of the passive blender 10''' gradually increases in diameter. Gas from the unconventional source 1 is input into the passive blender 10' in the central section. In particular, an input 22 from the unconventional source 1, 3 is substantially annular and surrounds the central section such that the gas from the unconventional source 1 is introduced around the gas from the grid gas pipeline 2, 11 substantially at a mid-point of the central section. The gas from the unconventional source 1 is at pressure 'P'. The gas from the grid gas pipeline 2 enters the passive blender 10' from pipe 11 at the same pressure 'p' as the gas in the grid gas pipeline, p being lower than P.

The decrease in diameter of the passive blender 10' in the input section 21, followed by the central section of relatively low diameter, followed by the increase in diameter of the passive blender in the output section 23 result in the passive blender 10' and the increased velocity and direction of the gas from input 3 using an inspiration effect to entrain and mix the gas from the grid gas pipeline 2 with the gas from the unconventional source 1.

Any of the passive blenders of FIGS. 3 to 6 may be used in the system of FIG. 2. In any such system a compressor 25 or other similar apparatus may be used to increase the pressure of the unconventional gas before it enters the passive blender 10, 10' or 10".

What is claimed is:

1. A system for introducing gas from an unconventional source into a grid gas pipeline comprising:
    a passive blender comprising:
        an input section,
        a grid gas input positioned at a start of the input section in a direction of flow,
        an unconventional source input positioned at the start or an end of the input section in the direction of gas flow, wherein the unconventional source input comprises a plurality of inputs each positioned at an angle to the direction of grid gas flow to promote entraining and blending,
        an output section, and
        wherein an internal flow path within the passive blender is shaped and sized to provide entraining and blending;
    a first gas input pipe from the grid gas pipeline into the grid gas input of the passive blender;
    a second gas input pipe from the unconventional source into the passive blender; and
    an output pipe from the output section of the passive blender to the grid gas pipeline.

2. The system according to claim 1, further comprising a sample point in the output pipe between the passive blender and the grid gas pipeline, wherein a sampler is provided at the sample point to measure one or more physical characteristics of gas passing through the sample point.

3. The system according to claim 2, further comprising:
    a gas conditioner located between the unconventional source and the sample point such that gas from the unconventional source is treated by the gas conditioner before passing through the sample point.

4. The system according to claim 3, wherein the gas conditioner is configured to add propane or liquid petroleum gas into the first gas input pipe.

5. The system according to claim 3, wherein the gas conditioner is configured to add propane or liquid petroleum gas into the second gas input pipe.

6. The system according to claim 3, wherein the gas conditioner is configured to add propane or liquid petroleum gas into the output pipe before the sample point.

7. The system according to claim 3, wherein the gas conditioner includes a gas cleaner.

8. The system according to claim 1, further comprising a compressor or regulator located in the second gas input pipe to increase or decrease the pressure of gas from the unconventional source.

9. The system according to claim 1, wherein:
    the input section of the passive blender has a cross-section perpendicular to the direction of flow that decreases in the direction of flow; and
    the output section of the passive blender has a cross-section perpendicular to the direction of flow that increases in the direction of flow.

10. The system according to claim 1, wherein the unconventional source input is central within the input section and is surrounded by the grid gas input.

11. The system according to claim 1, wherein the unconventional source input is substantially annular and surrounds the end of the input section.

12. A method of conditioning a gas from an unconventional source to allow the gas to be entered into a main grid gas pipeline, the method comprising:
    providing a passive blender comprising an input section, a grid gas input positioned at a start of the input section in a direction of flow, an unconventional source input positioned at the start or an end of the input section in the direction of gas flow, wherein the unconventional source input comprises a plurality of inputs each positioned at an angle to the direction of grid gas flow to promote entraining and blending, an output section, and wherein an internal flow path within the passive blender is shaped and sized to provide entraining and blending;

providing a grid gas from the main grid gas pipeline into the grid gas input of the passive blender;

providing an unconventional gas from the unconventional source into the unconventional source input of the passive blender; and directing an output from the passive blender back into the main grid gas pipeline.

13. The method according to claim 12, further comprising:

sampling the output from the passive blender at a gas sample point and measuring one or more physical characteristics of gas passing through the gas sample point; and when the one or more of the physical characteristics is measured to be outside of an acceptable range for entering the main grid gas pipeline, injecting the unconventional gas with LPG or propane to alter the physical characteristics of the unconventional gas from the unconventional source.

14. The method according to claim 12 further comprising:

injecting liquid petroleum gas or propane into the unconventional gas to raise the calorific value of the unconventional gas prior to input into the passive blender.

15. The method according to claim 14, further comprising determining an amount of liquid petroleum gas or propane injected into the unconventional gas based on an analysis of the calorific value of the gas of the output of the passive blender.

16. The method according to claim 15, further comprising obtaining the analysis of the calorific value of the gas of the output from a sampling point positioned at the output.

17. The method according to claim 12, wherein:

the input section of the passive blender has a cross-section perpendicular to the direction of flow that decreases in the direction of flow; and the output section of the passive blender has a cross-section perpendicular to the direction of flow that increases in the direction of flow.

18. The method according to claim 12, wherein the unconventional source input is central within the input section and is surrounded by the grid gas input.

19. The method according to claim 18, wherein the unconventional source input is substantially annular and surrounds the end of the input section.

* * * * *